United States Patent [19]
Mortensen

[11] 3,815,729

[45] June 11, 1974

[54] ARTICLE ORIENTING APPARATUS

[75] Inventor: Peter Eli Mortensen, Milwaukie, Oreg.

[73] Assignee: Carlton Company, Portland, Oreg.

[22] Filed: June 2, 1972

[21] Appl. No.: 259,242

[52] U.S. Cl. ............................................. 198/287
[51] Int. Cl. ........................................... B65g 47/24
[58] Field of Search ............ 198/33 R, 33 AA, 209, 198/220 BC

[56] References Cited
UNITED STATES PATENTS

| 1,698,476 | 1/1929 | Frova | 198/33 AA |
| 3,168,949 | 2/1965 | Aidlin | 198/33 AA |
| 3,508,639 | 4/1970 | Braden | 198/33 AA |

FOREIGN PATENTS OR APPLICATIONS

| 43,394 | 7/1968 | Germany | 198/33 AA |

Primary Examiner—Richard E. Aegerter
Attorney, Agent, or Firm—Kolisch, Hartwell & Dickinson

[57] ABSTRACT

Apparatus and method for assemblying from a mass of articles a row of such articles. The articles in the mass are randomly orientated, and are assembled in the row with the articles having like orientation. The apparatus includes a container bottomed by a floor for supporting the mass of articles. A channel extending in an annular course over said floor is adapted to seat the articles with the articles having like orientation. A receiver having a channel therein is positioned adjacent the floor of the container with the channel of the receiver registering with and forming an extension of the channel of the floor. The container is revolved about an axis concentric with the axis about which said channel extends, to effect seating of the articles in the channel of the floor and subsequent transfer of articles to the channel of the receiver.

3 Claims, 4 Drawing Figures

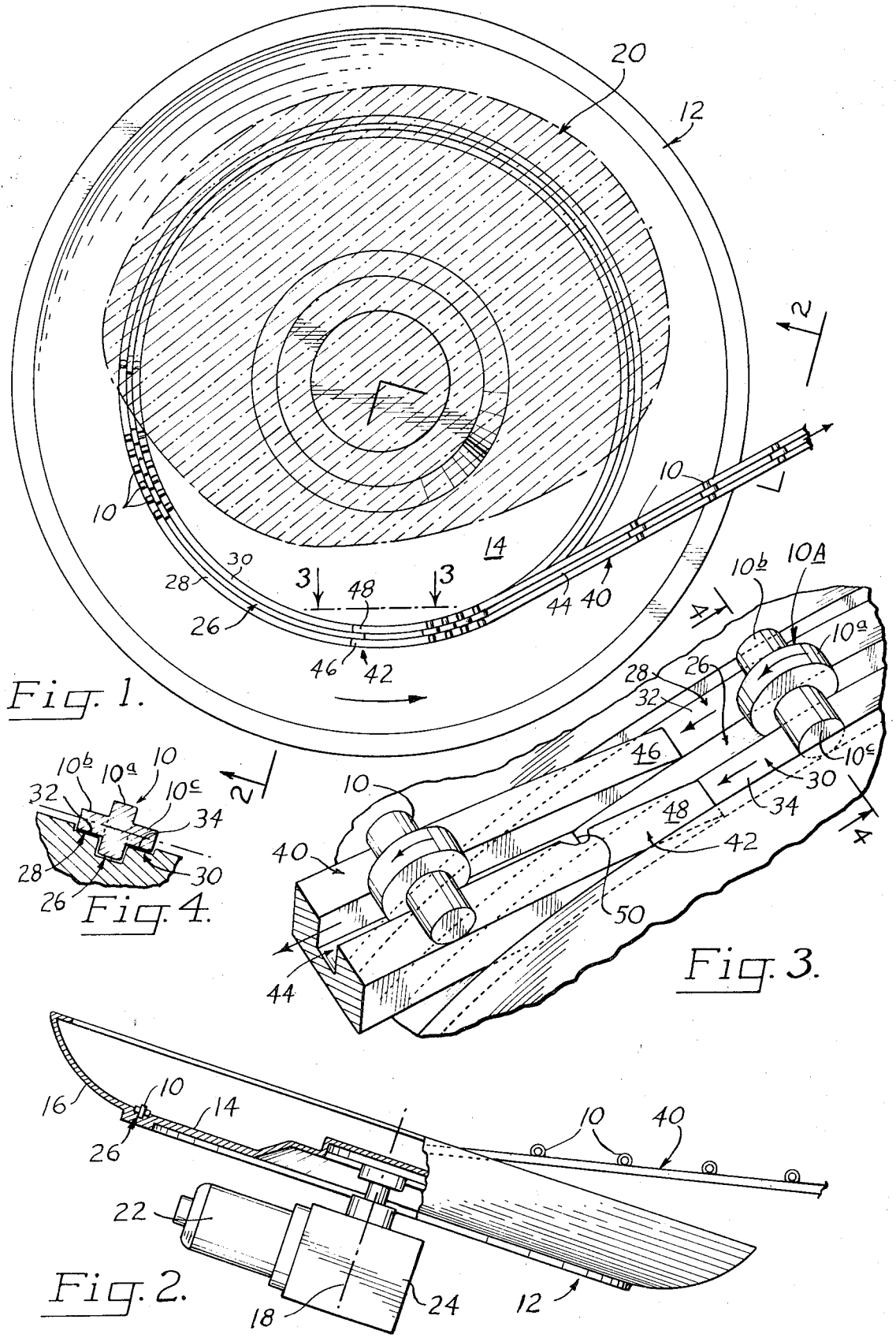

ARTICLE ORIENTING APPARATUS

This invention relates to apparatus and method for handling articles and more particularly to apparatus and method for assembling articles in a row with such articles taken from a supply comprising a mass of randomly oriented articles.

The invention is described herein in the context of a machine for handling rivets and the like, where it is desired to feed such rivets at a high rate of speed to some sort of processing equipment. In the feeding of such rivets, it is required that they have a predetermined orientation, the rivets being taken from a supply where they have random orientation. While the invention is described in conjunction with a rivet feeding machine, it is appreciated that features of the invention are applicable to other types of uses. Reference is made to rivets, therefore, only for illustrative purposes, and it is not intended by the discussion to be limited to any particular type of use.

A general object of the invention, therefore, is to provide new improved means and method for assembling articles with such having a predetermined orientation in such assembly.

A specific object is to provide apparatus of this description which is highly reliable in operation, with proper assembling being performed over long periods without malfunction.

Another object is to provide such an apparatus wherein initial orientation of the articles is performed by lodging them in a predetermined position on a moving floor supporting a mass of such articles.

A further object of the invention is to provide apparatus of the above general description where articles collect with predetermined orientation and in a row on the floor of a revolving container and are transferred out of such container while maintaining the same relative orientation.

Further objects, features and advantages of the present invention will become more fully apparent as the following description is read in conjunction with the accompanying drawings wherein:

FIG. 1 is a plan view, illustrating apparatus as contemplated herein according to one embodiment of the invention showing a disk-shaped container which may be employed for holding a mass of rivets during the process of assembling them as intended by the invention;

FIG. 2 is an elevation view taken generally along the line 2—2 in FIG. 1;

FIG. 3 is a perspective view somewhat enlarged taken generally along the line 3—3 in FIG. 2, illustrating how rivets are transferred to a receiver according to the instant invention; and FIG. 4 is a view taken along the line 4—4 in FIG. 3.

Referring now to the drawings, and first of all more particularly FIGS. 1 and 2, the apparatus illustrated is of the type that might be employed in assembling rivets such as may be utilized in a saw chain as a preliminary to processing such rivets as by heat treating them, etc. Each rivet has a shape, as perhaps best illustrated in FIG. 4, and exemplified by the rivet 10 shown in such figure. Thus, each rivet includes a substantially cylindrically shaped body 10a and substantially cylindrically shaped end extremities 10b and 10c which are axially aligned with the body 10a, and which have a diameter common to both end extremities which is somewhat less than the diameter of body 10a.

In the processing of the rivets, a mass of the rivets is deposited in what is broadly referred to herein as a support, more specifically comprising a disk-shaped container element or member given the general reference numeral 12. The container member is bottomed by a floor 14 with margins 16 turned upwardly whereby the floor bottoms a concave side of the container element.

The container member is mounted with the axis of the member inclined somewhat from a vertical, as perhaps best illustrated in FIG. 2, as exemplified by axis 18. This has the effect of canting the general plane of the floor whereby such is inclined somewhat from a horizontal position. A mass of rivets deposited in the container member, as exemplified by the shaded area shown at 20 in FIG. 1, thus tends to collect within the container member through the influence of gravity at a region of low elevation, which is generally to the right of the container member as illustrated in FIG. 2.

The container member is mounted for rotation about its axis 18, thus to produce revolving movement of the floor about this axis. Means is also provided for producing such movement under power. Thus, and as can be seen in FIG. 2, a motor is shown at 22 which on operation and through means 24 produces the described rotation of the container member. Rotation of the container member is in the direction indicated by the arrow in FIG. 1, i.e., a counterclockwise direction.

Recessed into the floor of the container member is an elongate, continuous channel shown at 26. The channel extends in an annular course about the floor of the container member, which course is concentric with axis 18. The channel has a side-to-side dimension which is just slightly greater than the width of a body 10a in the rivet. It will be noted that the diameter of this body 10a is substantially greater than the width of the body. As a consequence, a stabile, seated position for the rivet is attained only with the body 10a lodging within the channel while oriented with the axis of the body extending transversely of the channel. This position for a rivet is shown in FIG. 3, as demonstrated by the rivet 10A.

On each side of channel 26 a recessed shelf is included, such being exemplified by shelves 28 and 30, shown in FIGS. 3 and 4. The shelves extend in annular courses concentric with the channel 26. The shelves are bottomed by surfaces 32, 34, which along opposing margins form the shoulders defining opposite sides of channel 26. These surfaces have widths slightly exceeding the lengths of end extremities 10b, 10c in a rivet. As a consequence, when the rivet seats in the channel, its end extremities seat within the shelves described.

Illustrated at 40 is what is referred to herein as a receiver. Such includes an elongate member mounted in a stationary position and having a pick-up end indicated at 42, which is inside the container member and adjacent channel 26 at a region of high elevation in the channel. The receiver from its pick-up end extends approximately tangentially upwardly and outwardly from the inside of the container element.

Receiver 40 is provided with an elongate channel shown at 44 extending along the length thereof. This channel has substantially the same width as channel 26 in floor 14 of the container member.

At the pick-up end of the receiver, laterally spaced fingers 46, 48 are presented of substantially the width of shelves 28, 30. These fingers are received within the shelves, with beveled extremities riding smoothly over the shelves with rotation of the container member. The base of channel 44 in the pick-up end of the receiver is terminated by a deflector edge shown at 50, which is positioned above channel 26 of the container member and rides over the top of channel as the container member is rotated. It will be noted from this description that the channel of the receiver registers with the channel of the container member, and this registry is maintained with relative movement of the floor of the container member past the receiver, produced by rotating the container member. Furthermore, the channel 44 forms in effect an extension of the channel 26 in floor 14.

Explaining the operation of the device, with a mass of rivets deposited in the container member, as already explained, such tend to gravitate to the region of lower elevation which is to the right in FIG. 2. The rivets in such mass have a random orientation, as would be expected. With turning of the container member, the mass of rivets is agitated, with rivets falling on one another and subjected to constant relatively displacing forces. This movement of the rivets is further promoted by the incline of floor 14 tending to cause rivets to fall back on each other as they are constantly lifted out of the mass by turning of the floor.

During such random motion of the mass of rivets there is repeated movement of various ones of the rivets into the vicinity of channel 26, where such passes under the mass. The rivets have a relatively unstabile position in all positions other than with their bodies seated within the channel 26. Furthermore, with the rivets approximately, but not exactly, positioned over such channel, there is a tendency for such to turn and to drop into place. This turning and aligning function is promoted by the presence of the shelf on either side of the channel. Once a rivet becomes lodged in the channel, it becomes difficult to unseat, and any movement of the rivet with respect to the floor of the container is a rolling movement along the length of the channel 26. As a consequence, rivets tend continuously to collect in the channel with the axes of their bodies extending transversely of the channel, and tend to be carried up with the rotating floor into the pick-up end 42 of receiver 40. The receiver then picks up the rivets and the rivets move along the receiver while maintaining an orientation with respect to each other which is the same as their orientation when lodged within channel 26. In being picked up by the receiver and in moving therealong (the receiver being inclined as shown in FIG. 2) the rivets roll under the influence of gravity on their cylindrical sides.

It has been found that using the apparatus of the invention rivets can be fed at an extremely rapid rate into the receiver and thence to other processing machinery. The apparatus is highly reliable, with malfunctioning by this positioning of the rivets practically never occurring. Jamming and blockage of feed, such as characterizes certain types of equipment, is essentially eliminated.

It should be obvious that the concepts of the invention are applicable to different sizes and shapes of articles. Further, certain modifications and variations will suggest themselves to adapt the equipment for different specific uses.

It is claimed and desired to secure by letters patent:

1. Apparatus for assemblying, from a mass of randomly oriented similarly sized articles with substantially cylindrical bodies and substantially cylindrical and axially aligned end extremities of reduced diameter from the diameter of said bodies, a row of such articles with the articles having like orientation in such row, said apparatus comprising a substantially disk-shaped container including a floor with margins turning upwardly adjacent the perimeter of the container to impart a concave upper side to the container, a continuous channel recessed into the floor of said container adapted to seat the articles with their bodies lodged in said channel and oriented with the axes of the bodies extending transversely of the channel, said channel extending in an annular course which curves about an axis substantially concentric with the axis of the container, a pair of continuous shelves recessed into said floor and extending in annular courses adjacent opposite sides of said channel, said shelves having bottom surfaces defining elongate shoulders on either side of said channel, the width of said bottom surfaces of the shelves approximately corresponding to the length of the end extremities of said articles, means mounting the disk-shaped container with the axis thereof inclined from vertical, means for rotating said disk-shaped container about its said axis, and a receiver having a pick up end positioned adjacent said channel operable to pick up articles lodged in said channel, said receiver having a channel defined therein and being mounted in a stationary position with the channel of the receiver in registry with and forming an extension of the channel of the floor of the container, and said pick up end of said receiver includes a pair of laterally spaced fingers received within said shelves.

2. Apparatus for assembling articles in a row with such articles having like orientation in said row, the articles having substantially cylindrical bodies and coaxial substantially cylindrical end extremities of reduced diameter from the diameter of said bodies, the apparatus comprising a container for the articles including a rotatable floor which is rotatable about an inclined axis normal to the floor, power means for rotating the floor of the container, said floor having a continuous channel recessed therein with shoulders spaced inwardly from the sides of the container bounding opposite sides of said channel, said channel extending in an annular course concentric with said axis and being adapted to seat the articles with the bodies lodged in the channel and oriented with their axes extending transversely of said channel and said end extremities overlying said shoulders, and a receiver for the articles for picking them up as oriented in said channel, said receiver including a pickup end defined by laterally opposed, forwardly projecting fingers at said end separated by a space, said space having essentially the width of said channel, said fingers being disposed in overlying relation to said shoulders, said receiver further including a channel extending therealong having essentially the width of the channel in said floor which joins with the space between said fingers and which together with said space forms a tangential continuation of the channel in said floor whereby articles may move onto the receiver with their bodies lying in the channel of the receiver and oriented with their axes extending transversely of said channel.

3. The apparatus of claim 2, wherein said shoulders bounding opposite sides of the channel in said floor comprise the edge margins of annular shelves recessed into said floor.

* * * * *